(12) United States Patent
Kikuchi

(10) Patent No.: US 7,350,610 B2
(45) Date of Patent: Apr. 1, 2008

(54) RETAINING STRUCTURE FOR BATTERY COVER

(75) Inventor: Mitsuhiro Kikuchi, Hino (JP)

(73) Assignee: Hino Motors, Ltd., Hino-shi (JP)

( * ) Notice: Subject to any disclaimer, the term of this patent is extended or adjusted under 35 U.S.C. 154(b) by 128 days.

(21) Appl. No.: 10/577,153

(22) PCT Filed: Oct. 28, 2004

(86) PCT No.: PCT/JP2004/015998

§ 371 (c)(1),
(2), (4) Date: Apr. 26, 2006

(87) PCT Pub. No.: WO2005/042315

PCT Pub. Date: May 12, 2005

(65) Prior Publication Data

US 2007/0049095 A1    Mar. 1, 2007

(30) Foreign Application Priority Data

Oct. 31, 2003 (JP) .............................. 2003-372287

(51) Int. Cl.
*B60R 16/04* (2006.01)
*B60R 3/00* (2006.01)
(52) U.S. Cl. .................. 180/68.5; 280/163; 280/164.1
(58) Field of Classification Search .............. 180/68.5; 280/163, 164.1
See application file for complete search history.

(56) References Cited

U.S. PATENT DOCUMENTS 3,903,981 A * 9/1975 Peterson .................... 180/68.5
4,074,786 A * 2/1978 Joubert ....................... 180/68.5
4,779,692 A * 10/1988 Hagarty et al. ............ 180/68.5
4,836,568 A * 6/1989 Preslik et al. ............. 280/164.1
5,593,167 A * 1/1997 Barnhardt et al. ........ 280/164.1

FOREIGN PATENT DOCUMENTS

| JP | 58-17354 | 7/1956 |
|----|----------|--------|
| JP | 56814/1977 | 4/1977 |
| JP | 7-183016 | 7/1995 |
| JP | 11-339745 | 12/1999 |

\* cited by examiner

*Primary Examiner*—Christopher P. Ellis
*Assistant Examiner*—John R. Olszewski
(74) *Attorney, Agent, or Firm*—Oblon, Spivak, McClelland, Maier & Neustadt, P.C.

(57) ABSTRACT

In a battery mount structure wherein a battery carrier 5 with a battery 3 housed interiorly is arranged below a passenger step 19 to a vehicle, a battery cover 8 is adapted to be movable toward and away from the vehicle in the widthwise direction of the vehicle. In the battery cover 8, a top face member 8a of the battery cover 8 has an end adjacent to a chassis frame 1 which is adapted to be engaged with locked portions 6a and 6b on a back plate 4c of a battery carrier body 4. An end of the battery cover 8 away from the chassis frame 1 is provided with a front wall 8b having a locking portion 10, the locking portion 10 being adapted to be engaged with a locked portion 4d' of the battery bracket 4d.

4 Claims, 11 Drawing Sheets

RETAINING STRUCTURE FOR BATTERY COVER

TECHNICAL FIELD

The present invention relates to a hold-down structure for a battery cover.

BACKGROUND ART

In a vehicle equipped with a battery, the battery may be arranged, for example, as shown in References 1 to 3. In Reference 1, a battery is housed in a casing mounted on a side of a chassis frame. A hold-down beam with an angle-shaped cross section abuts on the battery at an upper edge of the battery away from the chassis frame. Longitudinally oppositely formed on the hold-down beam are rod holes through each of which a rod extends obliquely downward toward the chassis frame and is engaged at its lower end to a side plate of the casing; thus, the battery is locked to the casing. The battery is covered at its top with a cover which is locked to the casing by clamps mounted on the casing.

Reference 2 shows a step arrangement equipped with a passenger step assembly having a box body used as a tool box or battery box. In a case of the assembly of Reference 2 having the box body used as a receptacle to house a battery, the battery is housed in the box body which is covered at its top with a panel or cover integral with the step assembly. In Reference 2, the cover is bolted to the box body.

In Reference 3, a vehicle body frame has a support plate fixed thereon. Arranged on the support plate is a wall plate on which in turn arranged is a battery. The wall plate is positioned on the support plate through engagement of projections of the former with through holes of the latter. A cover plate is mounted on the battery at a corner of the battery away from the vehicle body and is connected to the support plate through support rods extending substantially vertically, whereby the battery is locked.

[Reference 1] JP Utility Model Publication 58-17354

[Reference 2] U.S. Pat. No. 4,836,568

[Reference 3] JP 7-183016A

SUMMARY OF THE INVENTION

[Problems to be solved by the Invention]

In Reference 1, the cover must be detached upwardly so that the cover cannot be attached/detached without detaching a passenger step assembly when, for example, the battery is housed in a space defined by the step.

In Reference 2, the battery is housed in the boxy body defined by the passenger step assembly. When the cover is to be attached/detached, the step must be attached/detached together.

Reference 3 has no direct connection to the invention since it has no cover for the battery at all.

The invention was made in view of the above and has its object to provide a hold-down structure for a battery cover which is adapted to house a battery in a space below the passenger step and in which a battery cover covering over the battery is in the form of a slide structure so that the battery cover is attachable/detachable without detaching the passenger step and can be securely locked to the battery carrier.

[Means or Measure for Solving the Problems]

In a battery mount structure wherein a battery carrier for incorporation of a battery therein is arranged below a passenger step to a vehicle, said battery carrier comprising a battery carrier body and a battery bracket attached to the battery carrier body at an end of the battery carrier body away from a vehicle body, a hold-down structure for a battery cover according to the invention is constructed such that the battery cover fitted to said battery carrier is movable in a widthwise direction of the vehicle toward and away from the vehicle, said battery cover having at its end away from the vehicle body a locking portion, said locking portion being engageable with a locked portion of said battery bracket when the battery cover is fitted to the battery carrier, whereby the locked portion of said battery bracket serves as vertical hold-down means for the battery cover.

In a battery mount structure wherein a battery carrier for incorporation of a battery therein is arranged below a passenger step to a vehicle, said battery carrier comprising a battery carrier body and a battery bracket attached to the battery carrier body at an end of the battery carrier body away from a vehicle body, a hold-down structure for a battery cover according to the invention is constructed such that a battery cover fitted to said battery carrier is movable in a widthwise direction of the vehicle toward and away from the vehicle, said battery cover having a top face member with an end of the battery cover adjacent to the vehicle body being adapted to be engaged with locked portions on a back surface of said battery carrier body when the battery cover is fitted to the battery carrier, said battery cover having at its end away from the vehicle body a locking portion, said locking portion being engageable with a locked portion of said battery bracket when the battery cover is fitted to the battery carrier, whereby the locked portions on the back surface of said battery carrier body and the locked portion of said battery bracket serve as vertical hold-down means for the battery cover.

Further, in the hold-down structure for the battery cover according to the invention, a stopper is arranged on the battery carrier and on the battery cover so as to lock the battery cover to the battery carrier.

[Effects of the Invention]

In a hold-down structure for a battery cover according to the invention, the battery cover can be readily and surely locked to a battery carrier. When the battery is housed in a space below a passenger step, the battery cover can be attached/detached without detaching the passenger step.

Figure 1:
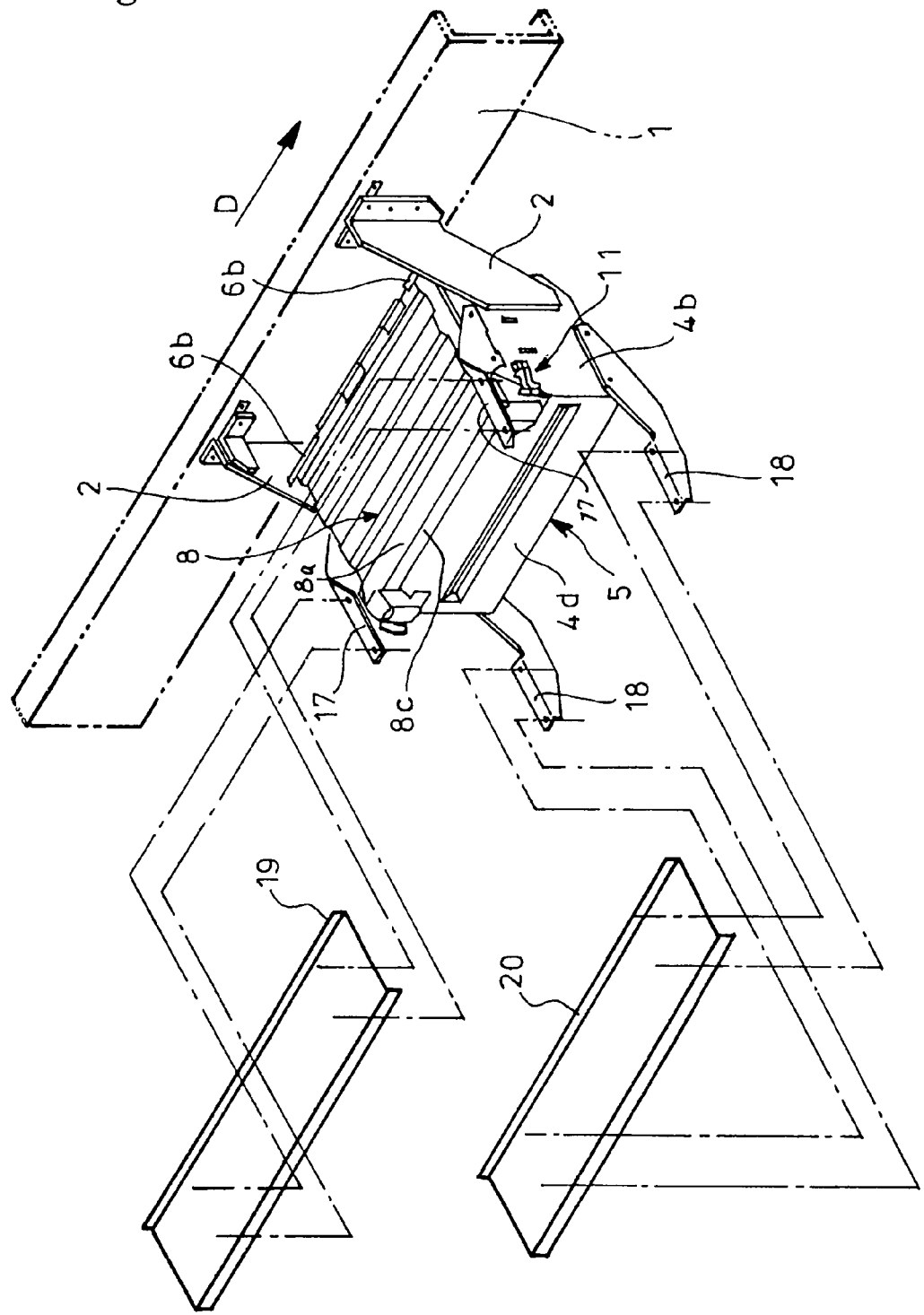
[FIG. 1] A perspective view showing an example of a battery mount structure to which applied is a hold-down structure for a battery cover according to the invention.

EXPLANATION OF THE REFERENCE NUMERALS 1 chassis frame (vehicle body)
3 battery
4 battery carrier body
4c back plate (back surface)
4d battery bracket
4d' locked portion
5 battery carrier
6a locked portion
6b locked portion
8 battery cover
10 locking portion
11 stopper

BEST MODE FOR CARRYING OUT THE INVENTION

An embodiment of the invention will be described in conjunction with the attached drawings.

Embodiment 1

FIGS. 1 to 18 are views showing the embodiment of the invention. In the description on structural elements hereinafter, lateral or widthwise direction of a structural element means an anteroposterior direction of the vehicle; an anteroposterior direction of the element means a widthwise direction of the vehicle.

FIG. 1 shows a battery mount structure to which applied is a hold-down structure for a battery cover according to the invention. In the figure, reference numeral 1 denotes a chassis frame; and 2, brackets arranged horizontally on either side of the chassis frame 1 to protrude outwardly in the widthwise direction of the vehicle, said brackets being spaced apart from each other by a predetermined distance in the anteroposterior direction of the vehicle. The bracket 2 is fixed at its one end to the chassis frame 1 and is downwardly declined in a direction away from the frame 1.

The brackets 2 are provided, at their tip ends away from the chassis frame 1, with a box-shaped battery carrier body 4 which comprises a bottom plate 4a (See FIGS. 2 and 18), side plates 4b (See FIGS. 1, 6, 7 and 12) spaced apart from each other by a predetermined distance in the anteroposterior direction of the vehicle and in contact with sides of the bottom plate 4a, and a back plate 4c (See FIGS. 2, 3, 8-10 and 18) in contact with ends of the plates 4a and 4b adjacent to the chassis frame 1, the carrier body 4 being opened at its top and at its tip end away from the chassis frame 1 and having a battery 3 housed interiorly. The plates 4a, 4b and 4c may be integrally formed or may be separately formed to be assembled. The bottom plate 4a may be flat as shown for example in FIG. 2; alternatively, it may have irregularities for reinforcement.

Arranged on the tip end of the battery carrier body 4 away from the chassis frame 1 is a battery bracket 4d which closes the opening of the tip end and which is bolted to an edge plate 4a' arranged on a tip, in the anteroposterior direction, of the bottom plate 4a of the battery carrier body 4 and bolted to the side plates 4b of the battery carrier body 4. Thus, the battery carrier body 4 and the battery bracket 4d provides a battery carrier 5.

An upper end of the back plate 4c of the battery carrier body 4 extends at its predetermined portions over the battery 3. The extended upper tip ends are bent in a direction away from the chassis frame 1 to provide locked portions (See FIGS. 2, 8-10 and 18). The locked portions are formed side by side in spaced apart relationship widthwise of the back plate 4c and are slightly different in height to provide gap G1 vertically of the locked portions (See FIG. 6).

Figure 7:
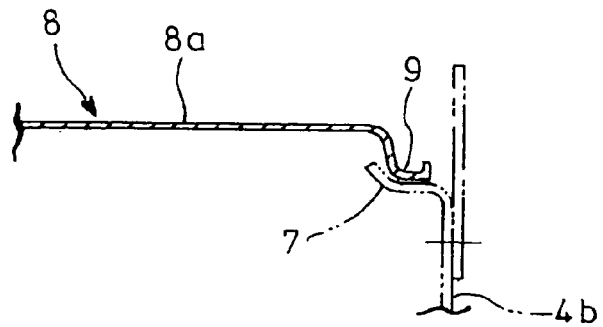
[FIG. 7] A view looking in the direction of arrows VII in FIG. 4.
Figure 8:
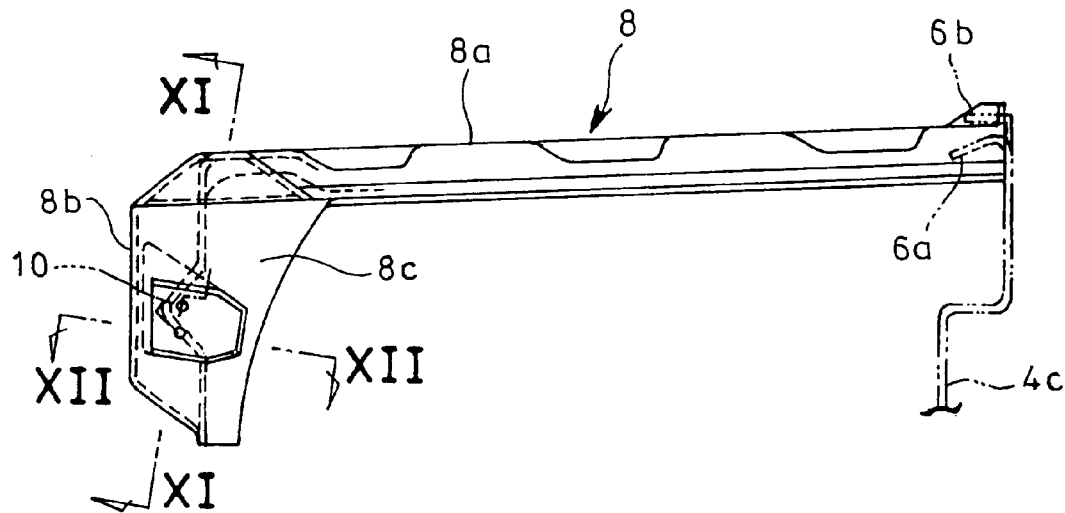
[FIG. 8] A view looking in the direction of arrows VIII in FIG. 5.

An upper end of the side plate 4b is bent toward widthwise center of the battery carrier body 4 to provide an edge-like guide 7 (See FIG. 7).

An upper end of the battery bracket 4d is formed with a locked portion 4d' (See FIGS. 2, 9, 10, 13, 14 and 18) which extends substantially all over the width of the bracket and protrudes in a direction away from the battery 3 and in the form of convex with a smaller triangular cross section.

Reference numeral 8 denotes a battery cover made from, for example, resin; its particulars are shown in FIGS. 3-12. More specifically, the battery cover 8 comprises a top face member 8a, a front wall 8b protruding downwardly by a predetermined distance at a tip end of the member 8a away from the chassis frame 1 and smaller side plates 8c which are arranged at laterally opposite sides of the front wall 8b and of the tip of the top face member 8a and integrally connected with the top face member 8a and front wall 8b.

The top face member 8a is formed with, for reinforcement of the member 8a, projections extending substantially all over the width of the member 8a and spaced apart from each other by a predetermined distance. Opposite widthwise edges of the top face member 8a are bent to protrude downward and are bent again at their lower ends outwardly of the width direction, thereby providing guided portions 9 (See FIG. 7). An end of the top face member 8a adjacent to the chassis frame 1 is positioned below and above the locked portions 6b and 6a of the back plate 4c of the battery carrier body 4, respectively, when the battery cover 8 is fitted to the battery carrier 5, whereby it is positioned in the gap G1 defined by the locked portions 6a and 6b and is engaged with the locked portions (See FIGS. 6 and 8-10). The locked portions 6a and 6b have been formed by bending forward the upper end of the back plate 4c alternately with different height.

A portion intermediate in height of the front wall 8b is formed with a locking portion 10 which extends widthwise by a predetermined length and which protrudes in the direction away from the battery 3 in the form of convex with a smaller triangular cross section. The locking portion 10 has a cross-sectional area larger than that of the locked portion 4d' so that, when the battery cover 8 is fitted to the battery carrier 5, inner surfaces of the locking portion 10 are engaged with outer surfaces of the locked portion 4d' (See FIGS. 2 and 9). Thus, the locked portion 4d' of the battery bracket 4d can restrict the vertical movement of the battery cover 8 in cooperation with the locked portions of the back plate 4c with which the end of the top face member 8a adjacent to the chassis frame 1 is engaged; thus, the locked portion 4d' and the locked portions serve as vertical hold-down means for the battery cover 8 (See FIG. 2).

Figure 9:
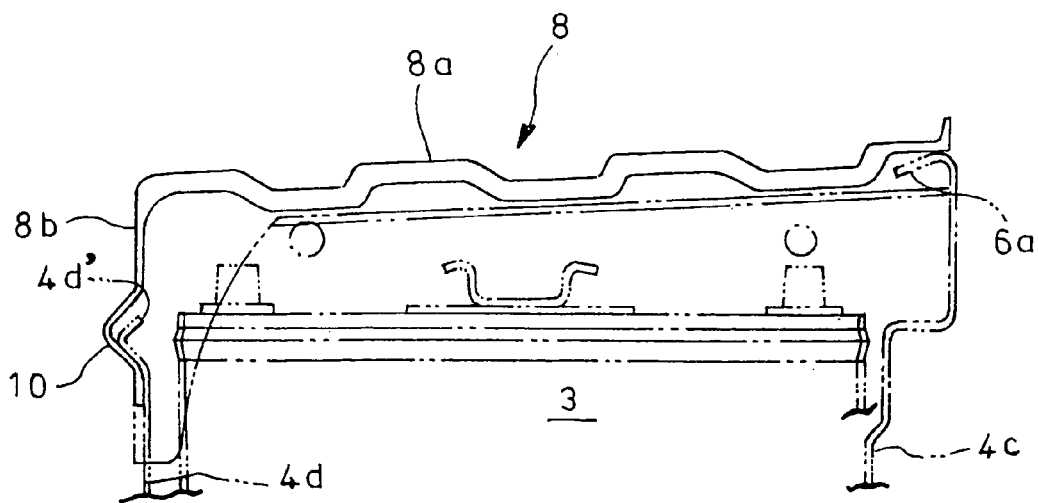
[FIG. 9] A view looking in the direction of arrows IX in FIG. 5.
Figure 10:
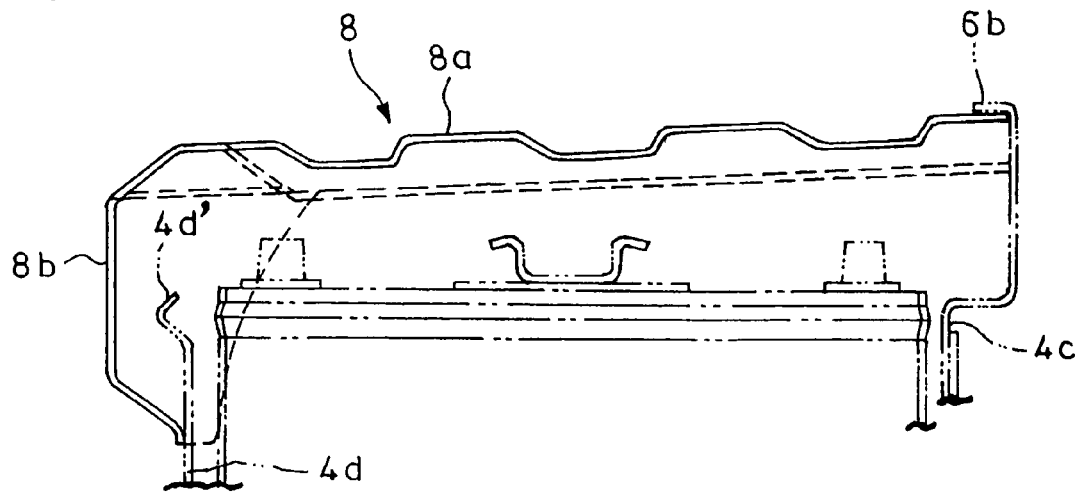
[FIG. 10] A view looking in the direction of arrows X in FIG. 5.
Figure 11:
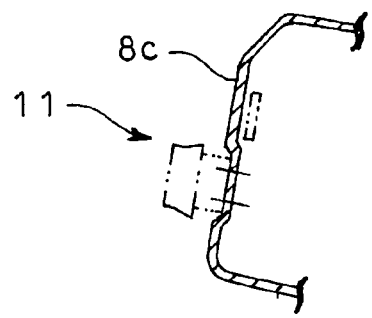
[FIG. 11] A view looking in the direction of arrows XI in FIG. 8.
Figure 12:
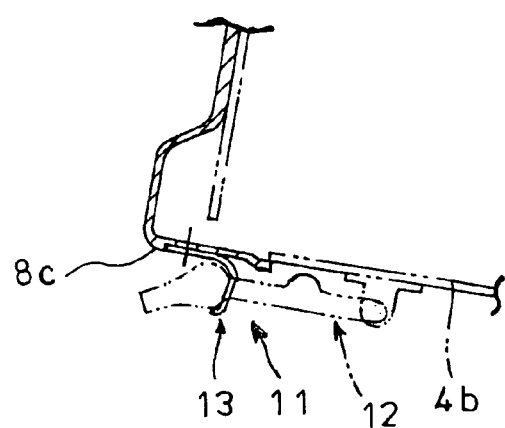
[FIG. 12] A view looking in the direction of arrows XII in FIG. 8.
Figure 13:
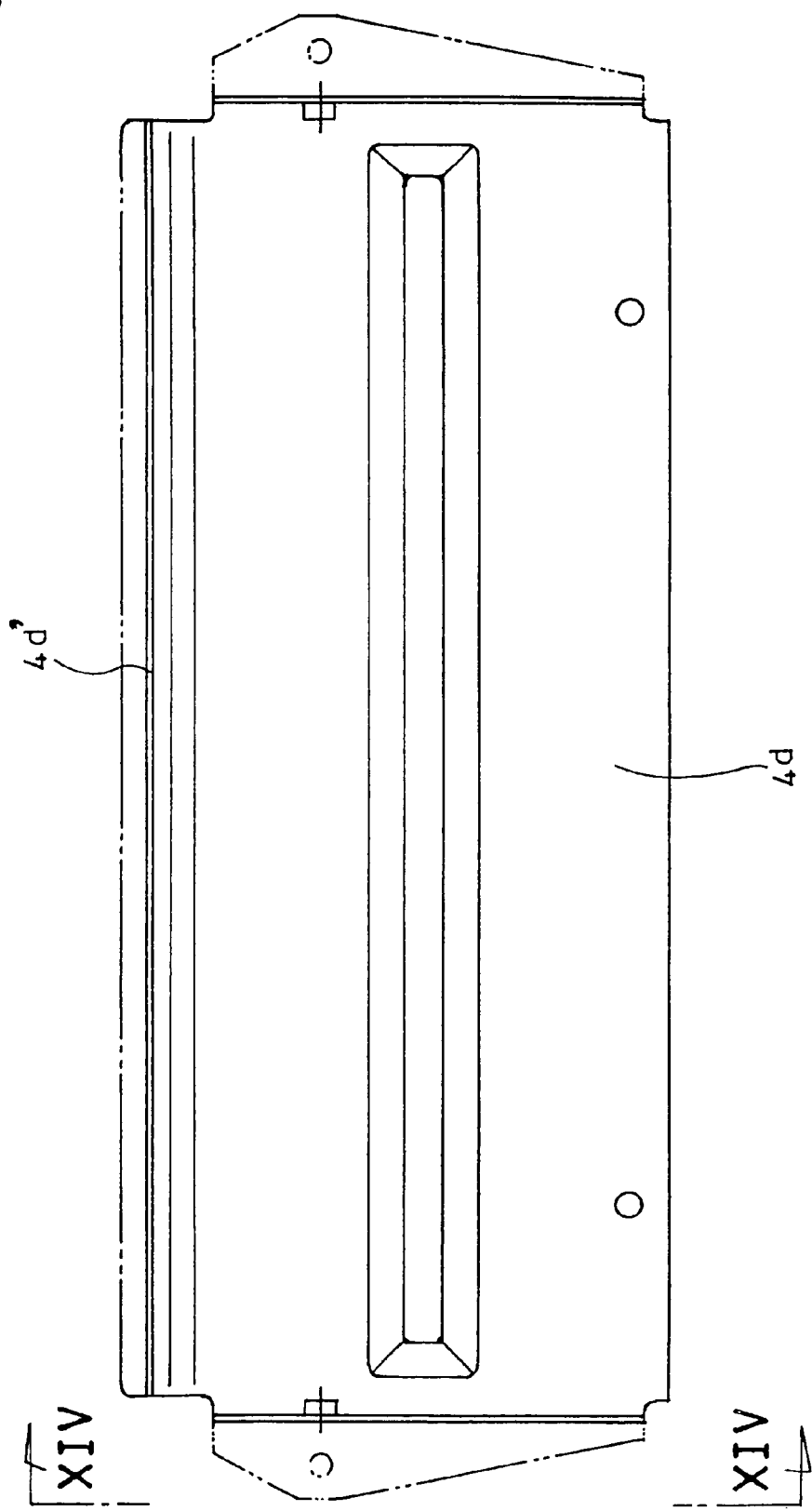
[FIG. 13] A front view of the battery bracket shown in FIG. 1.
Figure 14:
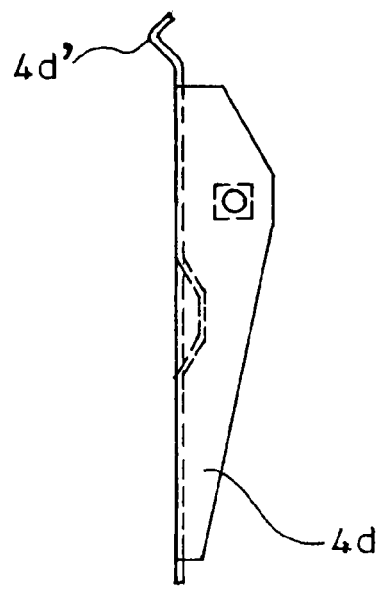
[FIG. 14] A view looking in the direction of arrows XIV in FIG. 13.

When the battery cover 8 is fitted to the battery carrier 5, the battery cover 8 covers all over the battery 3 including the upper end of the battery bracket 4d; the back end of the top face member 8a is engaged with the locked portions 6a and 6b on the upper end of the back plate 4c of the battery carrier body 4 while the front wall 8b is engaged at its locking portion 10 with the locked portion 4d' of the battery bracket 4d, the lower end of the front wall 8b abutting on the front surface of the battery bracket 4d (See FIGS. 9 and 10).

Figure 15:
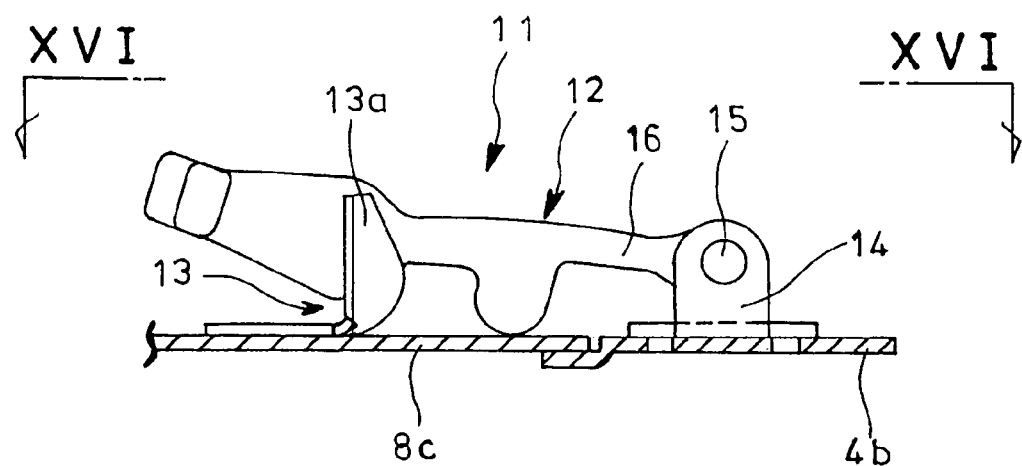
[FIG. 15] A side view of a stopper shown in FIG. 1.
Figure 16:
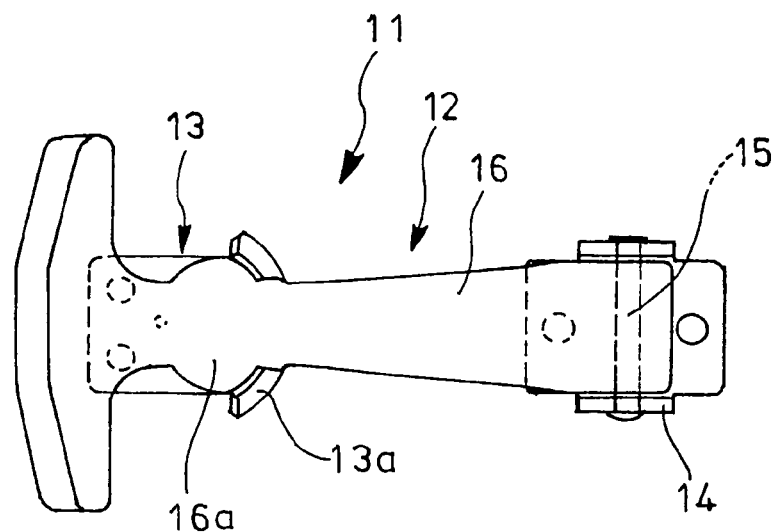
[FIG. 16] A view looking in the direction of arrows XVI in FIG. 15.
Figure 17:
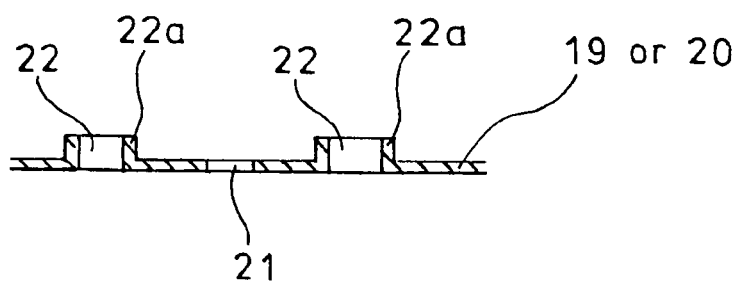
[FIG. 17] A partly detailed sectional view of a step shown in FIG. 1.

The battery cover 8 is adapted to be locked to the battery carrier body 4 by the stoppers 11. More specifically, each of the side plates 4b of the battery carrier body 4 has a stopper body 12 while each of the smaller side plates 8c at laterally opposite ends of the battery cover 8 has a stopped portion 13 (See FIG. 12). Particulars of the stopper 11 are shown in FIGS. 15 and 16; a bracket 14 is attached to each of the side plates 4b of the battery carrier body 4. A lever 16 is pivoted to the bracket 14 via a vertical pin 15 such that the lever 16 may be swung horizontally or slightly tilted to the horizontal by an angle of 0-50°. The stopped portion 13 mounted on each of the smaller side plates 8c of the battery cover 8 has a stopped portion body 13a which is in the form of a half of a ring. A shaft of the lever 16 is formed by a resilient member such as rubber.

The lever 16 has a longitudinally intermediate portion which is in the form of a larger-diameter stopper 16a. When the lever 16 is operated such that it is dragged forward through its handle so as to lock the battery cover 8 to the battery carrier 5, the stopper 16a is fitted into a semi-circular space of the stopped portion body 13a. As a result, the battery cover 8 is locked to the battery carrier 5.

Mounted on an upper portion of the side plate 4b of the battery carrier body 4 is a passenger step bracket 17 which extends widthwise of the vehicle; mounted on a lower portion of the side plate 4b is a passenger step bracket 18 which extends further than the passenger step bracket 17 in the direction away from the chassis frame 1. Thus, the passenger steps 19 and 20 can be bolted to the passenger step brackets 17 and 18. The passenger steps 19 and 20 have, as detailedly shown in FIG. 17, water drainage holes 21 and antiskid holes 22. The water drainage holes 21 has no protruded edges while the antiskid holes 22 has a slightly upwardly protruded edges 22a for antiskid.

Next, a mode of operation of the above embodiment will be described.

Figure 2:
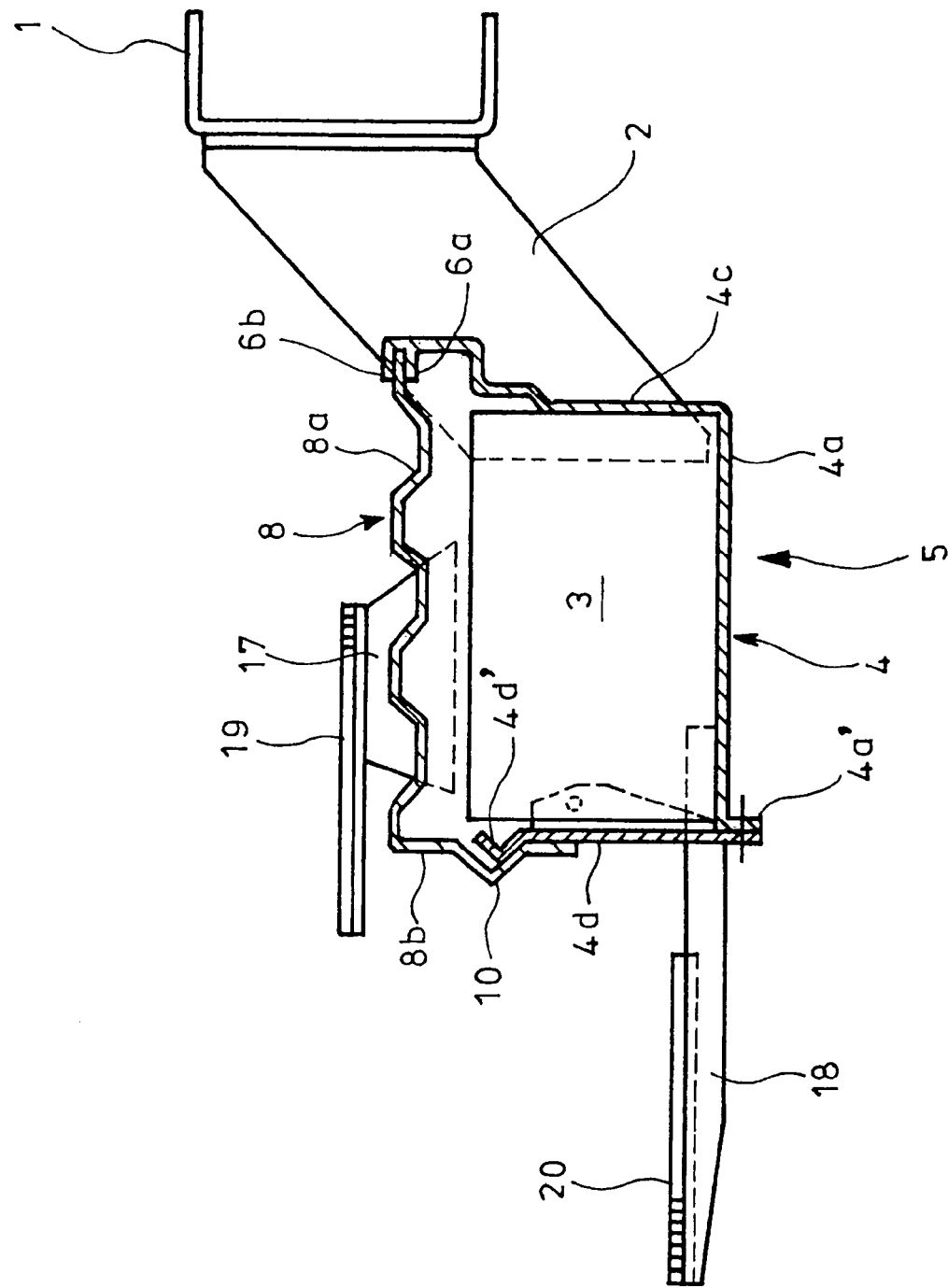
[FIG. 2] A sectional view showing an outline of the battery mount structure shown in FIG. 1.
Figure 3:
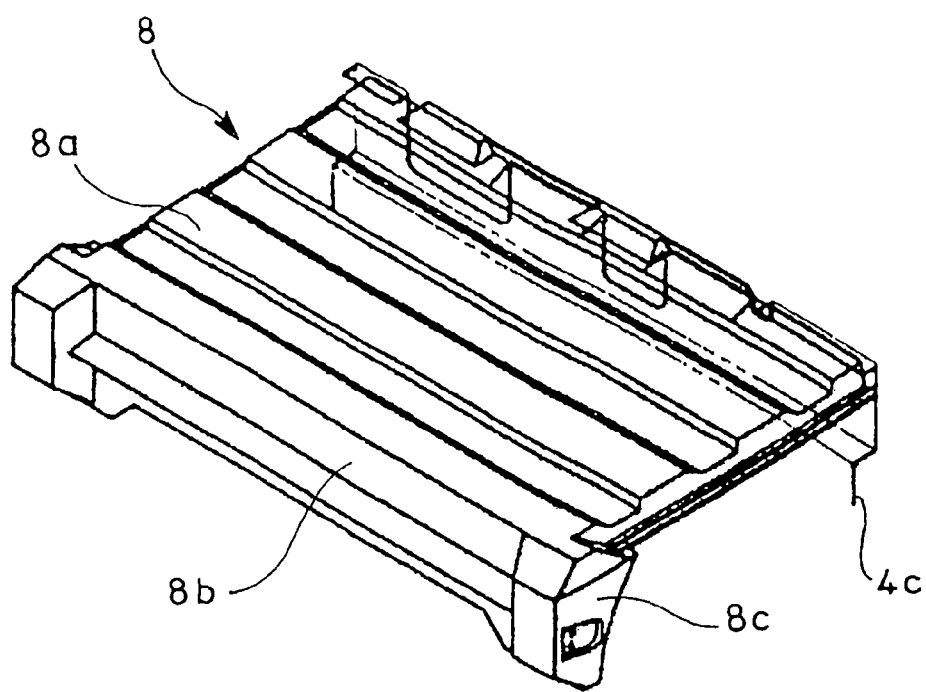
[FIG. 3] A perspective view of the battery cover shown in FIG. 1.
Figure 4:
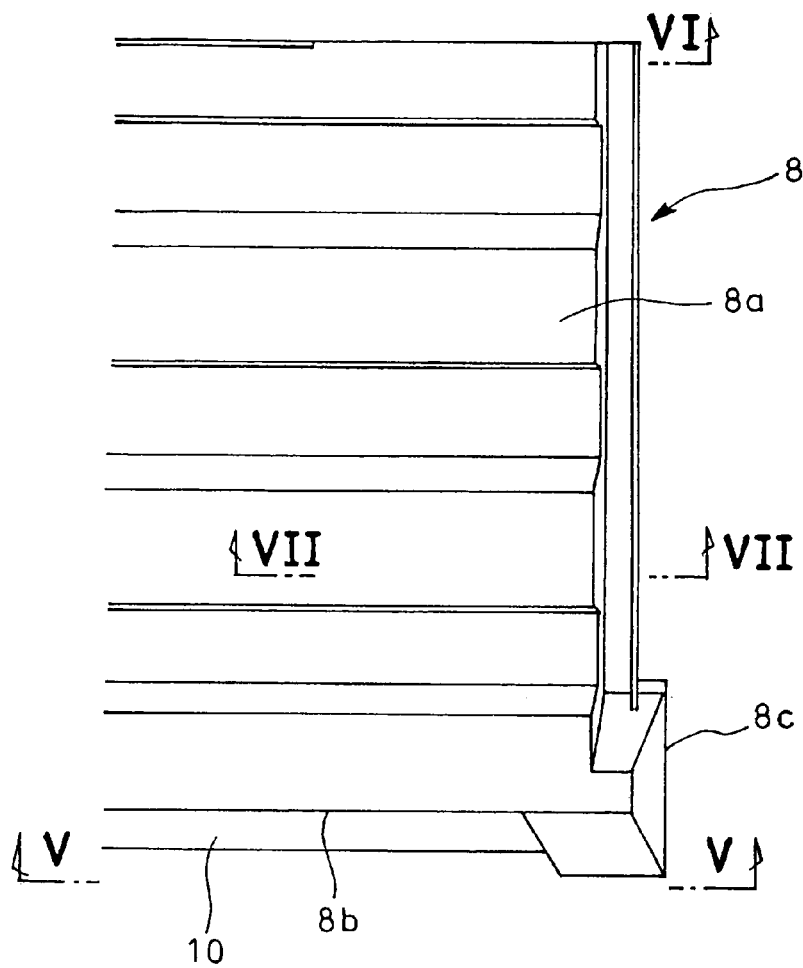
[FIG. 4] A plan view of the battery cover shown in FIG. 1.
Figure 5:
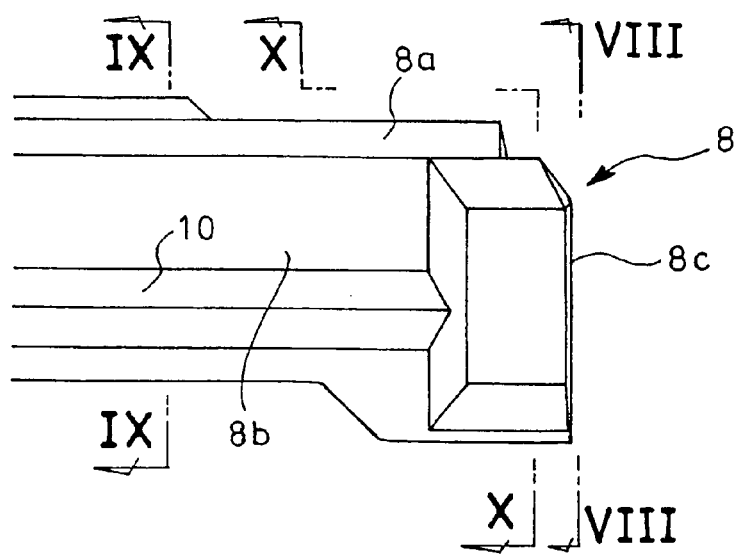
[FIG. 5] A view looking in the direction of arrows V in FIG. 4.
Figure 6:
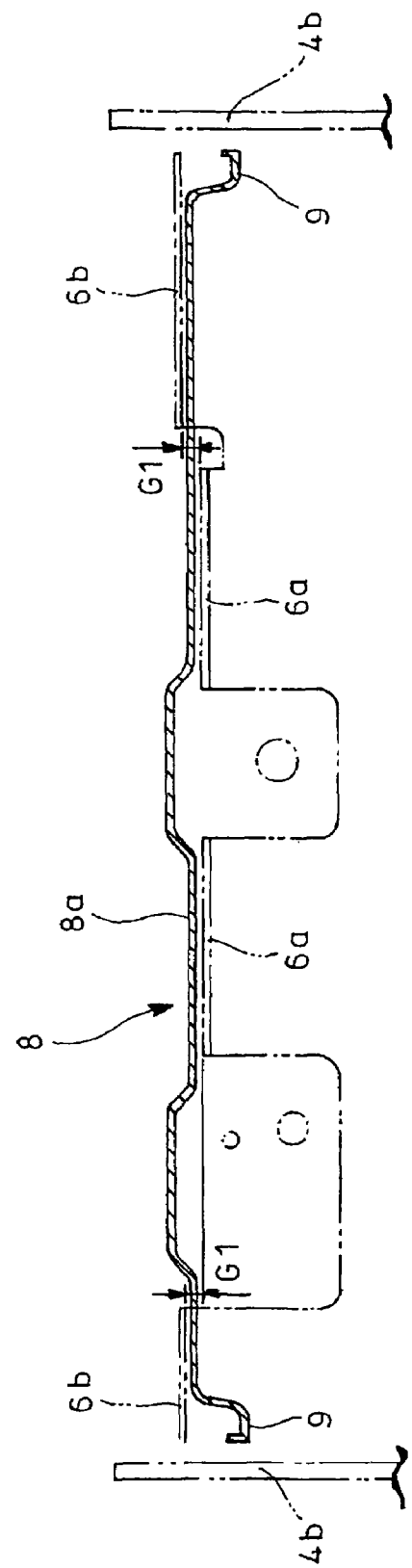
[FIG. 6] A view looking in the direction of arrow VI in FIG. 4.

A state where the battery 3 is housed in the battery carrier 5 and the battery cover 8 is fitted to the battery carrier 5 according to the embodiment is shown in FIG. 2. In this case, the back end of the top face member 8a of the battery cover 8 is engaged with the locked portions 6a and 6b such that it is inserted into the gap G1 between the locked portion 6a and 6b on the back plate 4c of the battery carrier body 4, while the locking portion 10 formed on the front wall 8b is engaged with the locked portion 4d' of the battery bracket 4d of the battery carrier body 4; the battery cover 8 is fixed to the battery carrier 5 by the stoppers 11. Furthermore, the passenger steps 19 and 20 are mounted on the passenger step brackets 17 and 18, respectively.

Movements of the battery cover 8 in the anteroposterior and lateral directions are restricted by the stoppers 11. In this case, the battery cover 8 is pulled by the stoppers 11 toward the chassis frame 1; when the lever 16 is pivoted in a tilted manner to the horizontal, it receives force directed slightly downward so that the battery cover 8 is locked to the battery carrier body 4. Vertical hold-down of the battery cover 8 is effected such that the back end of the top face member 8a of the battery cover 8 is engaged with the locked portions 6a and 6b on the upper end of the back plate 4c of the battery carrier body 4 while the locking portion 10 on the front wall 8b of the battery cover 8 is engaged with the locked portion 4d' of the battery bracket 4d.

Figure 18:
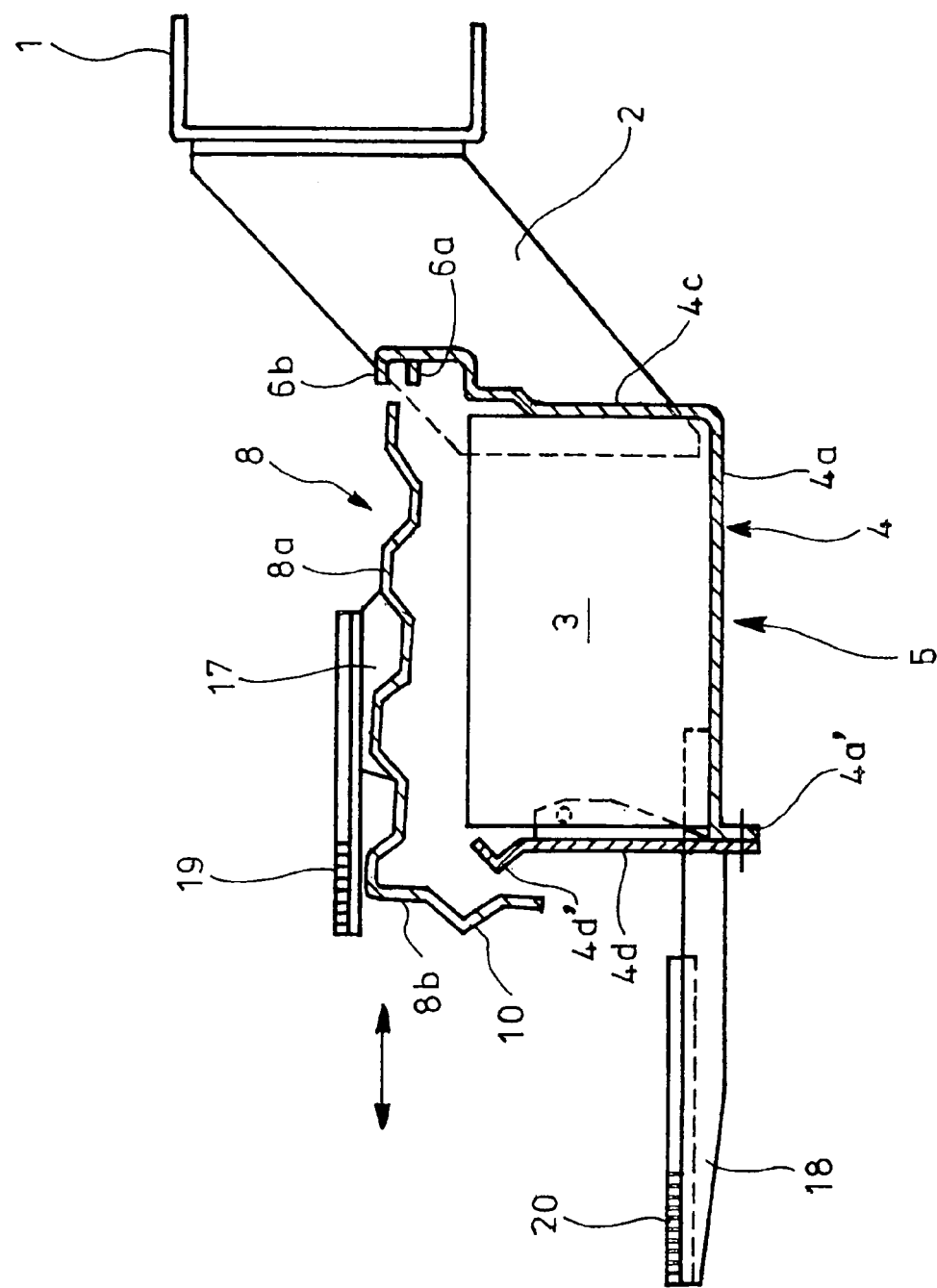
[FIG. 18] A sectional view showing an outline of attaching/detaching the battery cover to the battery carrier in the battery mount structure shown in FIG. 2.

When the battery cover 8 is to be removed from the battery carrier 5, the steps 19 and 20 remain to be mounted on the step brackets 17 and 18 while the stoppers 11 are dragged forward for loosening to remove the stopper bodies 12 from the stopped portions 13 as shown in FIG. 18, the battery cover 8 being moved horizontally from the gap between the steps 19 and 20 in the direction away from the chassis frame 1, thereby removing the battery cover from the battery carrier 5. When the battery 3 is to be removed from the battery carrier 5, it is conducted after the battery bracket 4d or the passenger step 19 is removed from the battery carrier body 4. The battery bracket 4d protects the battery 3 from rain water, mud-dubbling and/or dust.

When the battery cover 8 which has been removed is to be fitted back to the battery carrier 5, procedures effected are reverse to the detaching procedures; in this case, the guided portions 9 on the opposite ends of the top face member of the battery cover 8 are guided by the guides 7 on the side plates 4b of the battery carrier body 4.

According to the embodiment, locking of the battery cover 8 to the battery carrier 5 can be readily and surely effected. When the battery 3 is housed in the space below the passenger step 19, the battery cover 8 is attachable/detachable without detaching the steps 19 and 20.

It is to be understood that a hold-down structure for a battery cover according to the invention is not limited to the above-mentioned embodiment and that various changes and modifications may be effected without leaving the gist of the invention.

INDUSTRIAL APPLICABILITY

A hold-down structure for a battery cover according to the invention is applicable to various batteries, starting with a battery mounted on a vehicle such as an automobile.

The invention claimed is:

1. In a battery mount structure wherein a battery carrier for incorporation of a battery therein is arranged below a passenger step to a vehicle, said battery carrier comprising a battery carrier body and a battery bracket attached to the battery carrier body at an end of the battery carrier body away from a vehicle body, a hold-down structure for a battery cover wherein a battery cover fitted to said battery carrier is adapted to be movable in a widthwise direction of the vehicle toward and away from the vehicle, said battery cover having at its end away from the vehicle body a locking portion, said locking portion being engageable with a locked portion of said battery bracket when the battery cover is fitted to the battery carrier, whereby the locked portion of said battery bracket serves as a vertical hold-down means for the battery cover.

2. The hold-down structure for the battery cover according to claim 1 wherein a top face member of said battery cover is engaged, at its end adjacent to the vehicle body, with locked portions on a back surface of said battery carrier body when the battery cover is fitted to the battery carrier, whereby the locked portions on the back surface of said battery carrier body also serves as a vertical hold-down means for the battery cover.

3. The hold-down structure for the battery cover according to claim 1 wherein a stopper is arranged on the battery carrier and on the battery cover so as to lock the battery cover to the battery carrier.

4. The hold-down structure for the battery cover according to claim 2 wherein a stopper is arranged on the battery carrier and on the battery cover so as to lock the battery cover to the battery carrier.

* * * * *